United States Patent
Kimura et al.

(10) Patent No.: US 11,554,925 B2
(45) Date of Patent: Jan. 17, 2023

(54) METHOD AND SYSTEM FOR GAS TRANSFER TYPE FINE POWDER QUANTITATIVE FEEDING

(71) Applicant: Kinboshi Inc., Tokyo-to (JP)

(72) Inventors: So Kimura, Toyohashi (JP); Akira Sato, Toyohashi (JP)

(73) Assignee: Kinboshi Inc., Tokyo-to (JP)

( * ) Notice: Subject to any disclaimer, the term of this patent is extended or adjusted under 35 U.S.C. 154(b) by 0 days.

(21) Appl. No.: 17/296,632

(22) PCT Filed: Nov. 21, 2019

(86) PCT No.: PCT/JP2019/045530
§ 371 (c)(1),
(2) Date: May 25, 2021

(87) PCT Pub. No.: WO2020/110871
PCT Pub. Date: Jun. 4, 2020

(65) Prior Publication Data
US 2022/0017309 A1     Jan. 20, 2022

(30) Foreign Application Priority Data
Nov. 26, 2018   (JP) .............................. JP2018-220388

(51) Int. Cl.
*B65G 53/52*   (2006.01)
*B65G 53/24*   (2006.01)
*B65G 53/66*   (2006.01)

(52) U.S. Cl.
CPC ........... *B65G 53/526* (2013.01); *B65G 53/24* (2013.01); *B65G 53/521* (2013.01); *B65G 53/66* (2013.01)

(58) Field of Classification Search
None
See application file for complete search history.

(56) References Cited

U.S. PATENT DOCUMENTS 3,584,192 A * 6/1971 Maag ...................... F24F 6/025
                                                                    261/142
3,610,880 A * 10/1971 Kreiberg .............. A61M 11/041
                                                                    422/305

(Continued)

FOREIGN PATENT DOCUMENTS

JP     S52-69291 A     6/1977
JP     S54-32876 A     3/1979

(Continued)

OTHER PUBLICATIONS

International Preliminary Report on Patentability dated Nov. 16, 2020 in Patent Application No. PCT/JP2019/045530 (with English translation).

(Continued)

*Primary Examiner* — Joseph A Dillon, Jr.
(74) *Attorney, Agent, or Firm* — Element IP, PLC

(57) ABSTRACT

To provide a method for quantitatively and stably feeding fine powder and a system for carrying out the method. The present invention is characterized in that a gas transfer type fine powder quantitative feeding method for quantitatively transferring and feeding fine powder filled in a gas transfer type fine powder quantitative feeder to a fine powder using device by a carrier gas, wherein
when a mixed fluid of the fine powder and the carrier gas is transferred from the gas transfer type fine powder quantitative feeder to the fine powder using device, a water content in the carrier gas is adjusted to suppress an amount of static electricity that is generated in the mixed fluid.

9 Claims, 7 Drawing Sheets

(56) References Cited

U.S. PATENT DOCUMENTS

Figure 1:
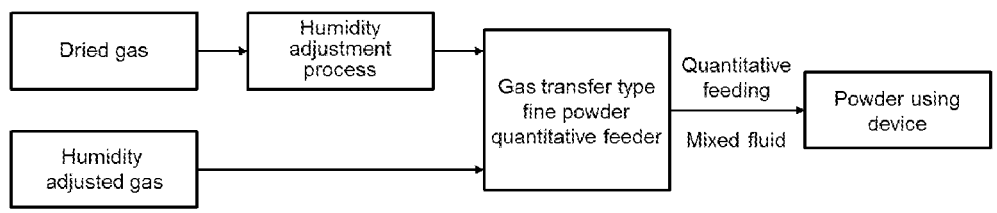

| | | | | |
|---|---|---|---|---|
| 4,227,835 | A * | 10/1980 | Nussbaum | H05H 1/42 406/52 |
| 4,455,288 | A * | 6/1984 | Salter | C01G 23/075 423/613 |
| 4,561,192 | A * | 12/1985 | Meade | A23C 1/05 34/368 |
| 4,582,731 | A * | 4/1986 | Smith | B05B 7/1486 427/427 |
| 4,731,517 | A * | 3/1988 | Cheney | C23C 4/134 425/7 |
| 4,784,302 | A * | 11/1988 | Raman | B22F 9/082 425/7 |
| 5,019,686 | A * | 5/1991 | Marantz | B05B 7/224 239/81 |
| 5,049,408 | A * | 9/1991 | Klinedinst | B01J 2/006 427/67 |
| 5,588,787 | A * | 12/1996 | Manjunath | C25C 3/14 406/89 |
| 5,632,100 | A * | 5/1997 | Hansen | B29B 9/16 34/372 |
| 5,738,249 | A * | 4/1998 | Kikuchi | B01J 8/002 222/368 |
| 6,063,451 | A * | 5/2000 | Murata | B05D 1/06 427/458 |
| 6,173,602 | B1 * | 1/2001 | Moseley | G01N 27/125 73/31.06 |
| 6,325,854 | B1 * | 12/2001 | Murata | B05B 5/047 118/620 |
| 6,767,078 | B2 * | 7/2004 | Sato | B41J 2/162 347/45 |
| 9,376,272 | B2 * | 6/2016 | Sato | B65G 53/10 |
| 10,647,527 | B2 * | 5/2020 | Stark | B65G 53/10 |
| 10,792,692 | B2 * | 10/2020 | Seo | F24F 6/16 |
| 10,815,078 | B2 * | 10/2020 | Stark | B65G 53/60 |
| 2001/0046420 | A1 | 11/2001 | Noguki | |
| 2005/0169615 | A1 * | 8/2005 | Glucksman | F24F 6/025 261/DIG. 65 |
| 2009/0212140 | A1 * | 8/2009 | Ritzenthaler | B02C 23/24 241/24.1 |
| 2015/0191316 | A1 * | 7/2015 | Sato | B23K 26/144 406/122 |
| 2016/0221009 | A1 * | 8/2016 | Milli | B01D 53/02 |
| 2017/0304861 | A1 * | 10/2017 | Seo | B05B 17/0646 |
| 2018/0244482 | A1 * | 8/2018 | Stark | B65G 53/526 |
| 2018/0305140 | A1 * | 10/2018 | Stark | B65G 53/10 |
| 2020/0197847 | A1 * | 6/2020 | Jantes | B01D 45/16 |

FOREIGN PATENT DOCUMENTS

| | | |
|---|---|---|
| JP | S58-59124 A | 4/1983 |
| JP | S61-24930 A | 2/1986 |
| JP | H08309177 A | 11/1996 |
| JP | H10-22090 A | 1/1998 |
| JP | H11-64858 A | 3/1999 |
| JP | 2001139140 A | 5/2001 |
| JP | 2001341838 A | 12/2001 |
| JP | 2011120972 A | 6/2011 |
| JP | 2016040196 A | 3/2016 |
| JP | 2018118848 A | 8/2018 |
| KR | 10-1352093 B1 | 1/2014 |
| TW | 502307 B | 9/2002 |
| TW | 519581 B | 2/2003 |

OTHER PUBLICATIONS

International Search Report dated Feb. 10, 2020 in PCT/JP2019/045530, 3 pages.
Office Action dated Feb. 1, 2019 in Japanese Patent Application No. 2018-220388 (with English translation), 7 pages.
Office Action dated Jul. 12, 2019 in Japanese Patent Application No. 2018-220388 (with English translation), 5 pages.
Office Action dated Jul. 8, 2022 in Taiwanese Patent Application No. 108142701 (with English, translation), 16 pages.
Office Action dated Jun. 29, 2022 in Chinese Patent Application No. 201980077776.4 (with English translation), 20 pages.
Extended European Search Report dated Jul. 20, 2022 in Patent Application No. 19889796.9, 12 pages.

* cited by examiner

METHOD AND SYSTEM FOR GAS TRANSFER TYPE FINE POWDER QUANTITATIVE FEEDING

BACKGROUND OF THE INVENTION

Technical Field

The present invention relates to a gas transfer type fine powder quantitative feeding method and a fine powder quantitative feeding system, and a humidifying unit used in the method and system.

Background Art

Conventionally, a device that quantitatively and stably feeds powder having a fine particle size such as metal, ceramic, or plastic has been widely used, for example, in a thermal spraying device, a spacer spraying device for a liquid crystal substrate, a powder compression molding, a sandblast device, a powder coating device, and the like, (for example, refer to Patent Documents 1 and 2).

Patent Document 1 discloses a gas transfer type quantitative feeder for powder that can quantitatively feed a desired amount of powder in accordance with the properties of the powder by using a surface location detecting means for detecting the surface location of the powder, a level adjustment mechanism for adjusting an outlet of a feed nozzle to an appropriate position adjacent to the powder surface, and a controlling means to maintain the outlet of the feed nozzle to an appropriate position, which makes it possible to always determine the optimal device position for the outlet placed at the tip of the feed nozzle and the surface of the powder in the cassette container. Patent Document 2 discloses a gas-conveying type quantitative feeder for powder that can feed a desired amount of powder to a thermal spray device, etc. continuously for a long period of time.

In such a gas transfer type powder quantitative feeder, first, powder is quantitatively taken from a powder storage container into a powder transfer passage, and then, the powder taken is gas-transferred up to a target position, and a mixed fluid of the gas transferred at the target position and the powder is discharged so that quantitative feeding of the powder is carried out.

PRIOR ART DOCUMENT

[Patent Document 1] JP H8-309177 A
[Patent Document 2] JP 2016-40196 A

SUMMARY OF THE INVENTION

Quantitative and stable introduction of powder from a powder storage container into a powder transfer passage has been achieved by the inventions according to Patent Documents 1 and 2. However, such a device makes the powder electrostatically charged due to friction with the inner wall of the transfer passage during gas transfer, and particularly in the case of fine powder particles with extremely light mass, the fine powder particles adhere to the tube inner wall by failing to counter against electrostatic attractive force with the tube inner wall which is oppositely charged. Then, the layer of adhered fine powder grows as the operation time of the device is elongated, which ultimately blocks the transfer passage, possibly leading to feed suspension of the powder.

In order to avoid such a problem, there has been conventionally used a means in which a metal or a conductive plastic that facilitates charge transfer is used as a constituting material of a transfer passage to release the static electricity into the ground. However, when such a conductive material is used, there arises a new problem that the transfer passage must be replaced frequently because the transferred powder comes into contact with the transfer passage made of the conductive material to abrade the inner wall of the transfer passage. Further, there is also known a method of electrical neutralization by blowing oppositely charged ions to the generated electrical charges; however, the effect is low because even if ions having opposite charges are fed from an inlet of a long and thin passage such as the powder transfer passage, the charge of ions disappear on the way and do not spread over the entire transfer passage because the lives of the ions are short.

On the other hand, in the field of handling powder, basically the inclusion of water in the powder is avoided as much as possible, and particularly in the field of gas transfer type powder quantitative feeding, it is common to dry not only the powder but also the carrier gas. This is because a high water content causes liquid cross-linking between the particles that are the cause of inducing adhesion in between the particles which impairs the fluidity of the powder. However, although in the case of a powder kind that is dependent of powder fluidity, i.e. powder with good fluidity, reducing the liquid cross-linking by eliminating the water content contributes to its quantitative/stable feeding, in the case of powder such as fine powder with low fluidity, there is a need of a solution for the problem induced by static electricity because an adverse effect is rather large due to static electricity generated in a dry state.

Therefore, in order to quantitatively transfer and feed the fine powder by the carrier gas, there is a demand for a method for removing static electricity which is a cause of powder adhesion to the transfer passage and a system used for such a method.

The present invention has been made in view of the above-described problem, and an object of the present invention is to provide a gas transfer type fine powder quantitative feeding method and system capable of quantitatively and stably transferring and feeding powder, in particular, fine powder having an extremely light mass. The present invention is also to provide a carrier gas humidifying unit that can be used in such method and system.

In order to solve the above-mentioned problem, the present invention provides a gas transfer type fine powder quantitative feeding method for quantitatively transferring and feeding fine powder filled in a gas transfer type fine powder quantitative feeder to a fine powder using device by a carrier gas, wherein the gas transfer type fine powder quantitative feeding method is characterized in that when a mixed fluid of the fine powder and the carrier gas is transferred from the gas transfer type fine powder quantitative feeder to the fine powder using device, a water content in the carrier gas is adjusted to suppress an amount of static electricity that is generated in the mixed fluid.

In the gas transfer type fine powder quantitative feeding method of the present invention, the gas transfer type fine powder quantitative feeder comprises:

a fine powder storage container that stores the fine powder;

a housing that stores the fine powder storage container in a gas-tight manner;

a feed port that feeds the carrier gas to the housing;

a flow rate adjustment mechanism that adjusts a feed amount of the carrier gas to the housing;

a feed nozzle that feeds the fine powder from the fine powder storage container to the fine powder using device entrained with the carrier gas;

a position detection sensor for detecting a relative position between the feed nozzle and the fine powder surface;

a driving part that moves the feed nozzle in an up and down direction; and a humidity measuring sensor for measuring humidity in the housing;

wherein the water content of the carrier gas is preferably adjusted by humidity information acquired from the humidity measuring sensor.

In the gas transfer type fine powder quantitative feeding method of the present invention, the water content of the carrier gas is preferably adjusted so that scattering time τ of static electricity generated in the mixed fluid is 0 to 10 seconds.

In the gas transfer type fine powder quantitative feeding method according to the present invention, the fine powder preferably has an average particle size of 10 µm or less.

According to another aspect of the present invention, the present invention provides a gas transfer type fine powder quantitative feeding system comprising: a humidifying chamber for humidifying a carrier gas; and a gas transfer type fine powder quantitative feeder that quantitatively feeds a mixed fluid of the carrier gas and fine powder to a fine powder using device by feed of the carrier gas from the humidifying chamber, wherein the gas transfer type fine powder quantitative feeder comprises:

a fine powder storage container that stores the fine powder;

a housing that stores the fine powder storage container in a gas-tight manner;

a feed port that feeds the carrier gas to the housing;

a flow rate adjustment mechanism that adjusts a feed amount of the carrier gas to the housing;

a feed nozzle that feeds the fine powder from the fine powder storage container to the fine powder using device entrained with the carrier gas;

a position detection sensor for detecting a relative position between the feed nozzle and the fine powder surface;

a driving part that moves the feed nozzle in an up and down direction; and a humidity measuring sensor for measuring humidity in the housing; and wherein the humidifying chamber comprises:

a water tank that stores liquid for humidifying the carrier gas;

an ultrasonic vibration mechanism for atomizing the liquid; and a humidity control mechanism for controlling humidity in the housing in conjunction with the humidity measuring sensor.

In the gas transfer type fine powder quantitative feeding system of the present invention, the humidity control mechanism adjusts the water content of the carrier gas so as to reduce generation of static electricity in the mixed fluid.

In the gas transfer type fine powder quantitative feeding system of the present invention, the average particle size of the fine powder is preferably 10 µm or less.

In still another aspect of the present invention, the present invention provides a carrier gas humidifying unit for use in the above gas transfer type fine powder quantitative feeding system, wherein the humidifying unit comprises:

a humidity measuring sensor for measuring humidity in the housing;

a humidifying chamber for humidifying the carrier gas;

a humidifying carrier gas feed nozzle for feeding the humidified carrier gas to the device; wherein the humidifying chamber comprises:

a water tank that stores liquid for humidifying the carrier gas;

an ultrasonic vibration mechanism for atomizing the liquid; and a humidity control mechanism for controlling humidity in the housing in conjunction with the humidity measuring sensor.

According to the present invention, it is possible to quantitatively and stably transfer and fine powder with extremely light mass to a device using the fine powder.

BRIEF DESCRIPTION OF THE DRAWINGS

FIG. 1 is a conceptual diagram of a method for quantitatively feeding a fine powder according to the present invention.

FIG. 2 is a conceptual diagram of fine powder deposition in a tube for powder transfer.

FIG. 3 is a figure showing a fine powder feeder according to one embodiment of the present invention.

FIG. 4 is a figure showing a part of a feed nozzle according to one embodiment of the present invention.

FIG. 5 is a figure showing a configuration of a gripping portion attached to the vicinity of a tip of a rod according to one embodiment of the present invention.

FIG. 6 is a diagram showing a fine powder feed system according to one embodiment of the present invention.

FIG. 7 is a figure showing a humidifying unit according to one embodiment of the present invention.

FIG. 8 is a relationship diagram between $\tau$ and absolute humidity in a test example of the present invention.

FIG. 9 is a relationship diagram between $\tau$ and blockage in a tube in a test example of the present invention.

FIG. 10 shows a result of a powder feed test in a test example of the present invention.

FIG. 11 is a test result of the relationship between the absolute humidity and the feedable time of fine powder in the test example of the present invention.

MODE FOR CARRYING OUT THE INVENTION

Hereinafter, modes for carrying out the present invention (hereinafter referred to as embodiments) will be described in details with reference to the drawings. Note that, the present invention shall not be limited to the embodiments described below. In addition, constituting elements in the embodiments described below include those that can be easily predicted by those skilled in the art and those that are substantially the same. Further, the constituting elements disclosed in the embodiments below can be appropriately combined.

<Gas Transfer Type Fine Powder Quantitative Feeding Method>

The gas transfer type fine powder quantitative feeding method of the present invention shall be explained. FIG. 1 is a conceptual diagram of a gas transfer type fine powder quantitative feeding method according to the present invention. The gas transfer type fine powder quantitative feeding method of the present invention is characterized in that humidity of the carrier gas is adjusted such that static electricity in the mixed fluid of the fine powder and the carrier gas generated at the time of transferring the fine powder is reduced. As shown in Flow 1 in FIG. 1, the humidity of the carrier gas can be adjusted by, for example, mixing a high-humidity gas when the dry gas is fed from the gas feed source to the fine powder feeder. As shown in Flow 2 of FIG. 1, a carrier gas with its humidity adjusted beforehand may be prepared, and the humidity-adjusted carrier gas may be fed to the fine powder feeder as it is.

The method for adjusting humidity (humidification) of the carrier gas can be carried out by any method as long as the present invention can exert its effect. For example, the humidity of the carrier gas can be adjusted to be in a desired range by mixing a dry gas and a high-humidity gas containing liquid atomized by atomization and appropriately adjusting the mixture ratio. The atomization method of the liquid is commonly done by way of ultrasonic wave. Therefore, the gas transfer type fine powder quantitative feeding method of the present invention may include a step of mixing the dry gas and the high-humidity gas to adjust the humidity before feeding the carrier gas to the fine powder quantitative feeder, or the carrier gas whose humidity has been adjusted in advance may be supplied to the fine powder quantitative feeder as it is.

In the present invention, fine powder refers to fine powder having an average particle size of 10 μm or less, and the smaller the average particle size is, the fine powder is more likely to be affected by static electricity. Examples of the fine powder include, but are not particularly limited to, metal, plastic, and ceramic. In addition, since plastic and ceramic which are light in mass are more easily charged than metal and more likely to be affected by static electricity, there is a high demand for removal of static electricity. In the present invention, the average particle size of the fine powder can be calculated by geometric particle size measurement using an image measurement method when, for example, in the case of powder used in general thermal spraying.

Accordingly, in the case of a fine powder having an extremely small particle size and an extremely light mass, it is impossible to prevent the adsorption between the fine powders to each other or between the fine powder and other substances by reducing liquid cross-linking force or capillary force by removal of water as carried out in the conventional powder feed field. Fluidity of the powder, contributing to the easiness of the powder being transferred, has higher dependency on surface properties as the particle size gets smaller, and due to the friction generated between the powder and the transfer tube at the time of transfer, particularly in the case of inside a tube like a transfer tube, the absorption of the fine powder is more dominated by the static electricity force than by liquid cross-linking by water. Further, the means where metal or conductive plastic in which charge transfer is easy is used as the material for constituting the transferring path to release static energy to the ground has a new problem that friction of the transferring path is generated. Further, neutralization by oppositely charged ions is less effective in the powder transferring path having a very long and narrow form because the ions do not sufficiently spread inside the tube.

Figure 2:
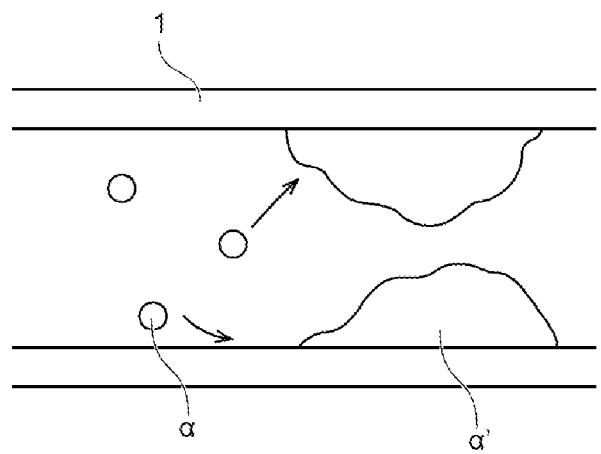

Here, static electricity is a physical phenomenon caused by electric charges which are static, and it is considered that the static electricity is generated when fine powder moving at a speed equal to or higher than a certain level comes into contact with the inner wall of the transferring tube during gas transfer of the fine powder in the case of feeding the fine powder. As shown in FIG. 2, when static electricity is generated in the mixed fluid during transfer of the fine powder, fine powder a having an extremely light mass is drawn and attached to transferring tube 1, and is deposited on the inner wall of the tube 1. Then the deposited fine powder a' further deposits by drawing fine powder a that is transferred afterwards, and eventually the transferring tube 1 gets blocked, making it impossible to feed the fine powder a. Therefore, suppressing static electricity in the mixed fluid of the fine powder a and the transferring gas is important in quantitative and stable feeding of the fine powder.

On the other hand, when the humidity of the carrier gas is too high or when the fine powder itself is humidified, the fine powder could adhere to the inside of the transferring path due to dew condensation, making it impossible being fed, or its melting could be incomplete in the subsequent thermal spraying.

Taking into consideration such a situation, the present inventors have found that the problem caused by static electricity generated in the process of transferring and feeding can be solved by adjusting the humidity of the carrier gas, which conventionally was dried in general, within a predetermined humidity range.

<Scattering Time τ>

Figure 8:
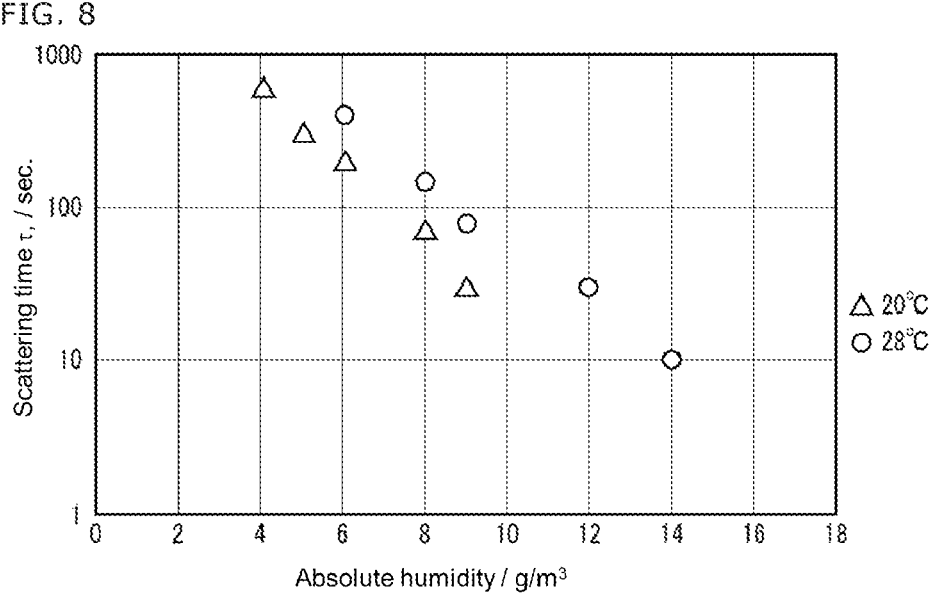

As an indicator of the magnitude of the influence of static electricity on powder transfer, evaluation can be carried out by using scattering time τ. τ is a parameter indicating the time from generation to elimination (scattering) of the static electricity. For example, as is clear from a graph (FIG. 8) showing the relationship between τ and the absolute humidity in a test example described below, it is known that the higher the absolute humidity is, the static electricity is less likely to be charged, and thus τ becomes smaller, and that there is an extremely high correlation between the fact that static electricity is uneasily accumulated and humidity. It is also known that the lower the temperature is, the smaller τ becomes in the same absolute humidity. Therefore, it can be said that the time until the static electricity eliminates can be shortened by lowering the temperature while maintaining the absolute humidity high. In the present invention, the scattering time τ refers to a value measured by the following method. That is, a certain amount of charged fine powder (e.g. alumina powder) is stored in a faraday cup and placed in a humidifying chamber kept in a predetermined humidity. Then, immediately after placing the faraday cup storing the fine powder in the humidifying chamber, charged amount of the fine powder is measured by using a measuring instrument such as an electrostatic capacity meter to record a charged amount change curve, and the time until the charged amount of the fine powder decreases to 37.8% of the initial value at t=0 is read, and such time is defined as τ.

There is a correlation that is uniquely determined between the absolute humidity and τ, and if a numerical value of either one can be found out, it is possible to determine the other one in the case of static electricity generated in a specific substance. Specifically, the following relation is satisfied in between scattering time τ (second), electric resistance R (Ω) of a substance in which static electricity is generated, and static capacity C (F).

$$\tau = R \times C$$

Here, C is a value that can be measured by a static capacity meter such as an LCR meter, and since it is known that the electric resistance R has an exponential relationship with the absolute humidity, if either one of the absolute humidity and the scattering time τ can be found out, it is possible to calculate the other one.

In the present invention, scattering time τ is 0 to 10 seconds, preferably 0 to 8 seconds, more preferably 0 to 5 seconds. When τ is in such a range, the influence of static electricity generated in the tube on powder blockage is small, and the fine powder can be transferred and fed quantitatively and stably.

Determining such a correlation between τ and humidity in advance makes it possible to maintain the scattering time within a predetermined range by adjusting the humidity in the present invention.

Therefore, either the value of the scattering time τ or humidity is enough to be found out when the present invention is carried out.

<Fine Powder Quantitative Feeder>

The method for gas transfer type fine powder quantitative feeding according to the present invention can be carried out by using any fine powder quantitative feeder as long as the effect of the present invention can be exerted. In order to quantitatively and stably transfer and feed fine powder having an average particle size of 10 μm or less as in the present invention, it is preferable to use, without particular limitation, a so-called surface-profiling type powder quantitative feeder as disclosed in, for example, JP H08-309177 A, among conventional powder transfer devices.

Figure 3:
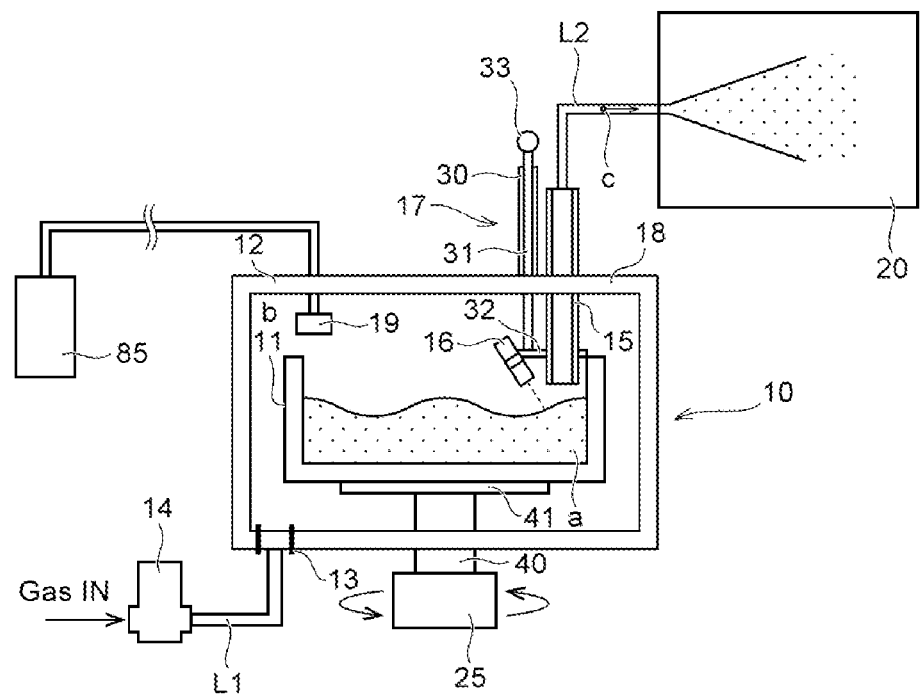

FIG. 3 is a figure showing one embodiment of a gas transfer type fine powder quantitative feeder that can be used in the method for gas transfer type fine powder quantitative feeding according to the present invention. As shown in FIG. 3, the gas transfer type fine powder quantitative feeder 10 includes a fine powder storage container 11, a housing 12, a feed port 13, a first flow rate adjustment mechanism 14, a feed nozzle 15, a position detection sensor 16, a position control mechanism 17, and a humidity measuring sensor 19.

The housing 12 includes the fine powder storage container 11 inside. The housing 12 is formed into, for example, a cylindrical shape. The housing 12 has a gas-tight structure and comprises a casing space b inside between the fine powder storage container 11. In addition, a humidity sensor 19 for monitoring the humidity of the casing space b may be provided, and the amount of the humidified carrier gas supplied from the feed port 13 to the housing 12 through the carrier gas feed path L1 may be adjusted by the first flow rate adjustment mechanism 14 in conjunction with the humidity sensor 19. By adjusting the feed amount of the humidified carrier gas in conjunction with the humidity sensor, it is possible to maintain the humidity inside the casing space b within the prescribed range. Further, an exhaust valve (not illustrated) may be provided so that the gas is exhausted when the pressure becomes equal to or higher than a predetermined pressure, in case when the pressure of the casing space b becomes excessively high.

The fine powder storage container 11 stores the fine powder a. The fine powder a may be filled in the fine powder storage container 11 before the start of the operation of the device, or may be filled by a feed nozzle (not illustrated) or the like, for example, while the device is being operated. The fine powder a is preferably filled in the fine powder storage container 11 beforehand so that the fine powder 11 can be fed outside from the start of operation of the device. The fine powder a stored in the fine powder storage container 11 is taken in with the carrier gas by the feed nozzle 15, passes through the fine powder feed path L2 as a mixed fluid c of the fine powder a and the carrier gas, and is supplied to the fine powder using device such as a thermal spraying device 20. Accordingly, the fine powder a can be prevented from blocking by the static electricity in the fine powder feed path L2 by adjusting the humidity of the carrier gas within the predetermined range when the fine powder a is supplied to the fine powder using device by a carrier gas.

The feed nozzle 15 discharges the fine powder a in the fine powder storage container 11 entrained by the humidity-adjusted carrier gas fed from the feed port 13. The carrier gas fed into the fine powder storage container 11 flows into the feed nozzle 15 while taking in the fine powder a in the fine powder storage container 11. The mixed fluid c flowing out from the feed nozzle 15 passes through the fine powder feed path L2 and is supplied to the fine powder using device such as the thermal spraying device 20.

It is preferable that the feed speed of the mixed fluid c supplied from the fine powder feeder 10 to the thermal spray device 20 is appropriately adjusted according to the purpose of use and the characteristics, for example, the specific gravity and the bulk density of the fine powder.

Figure 4:
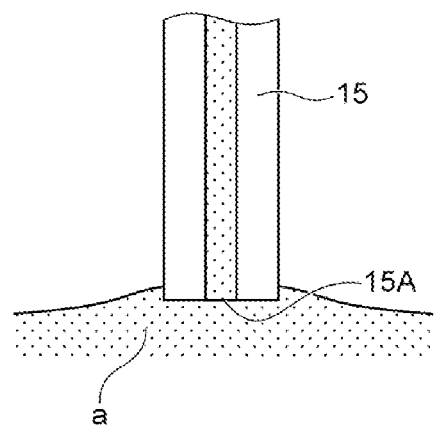

When the fine powder a in the fine powder storage container 11 is entrained by the carrier gas, it is preferable that the outlet 15A provided at the tip of the feed nozzle 15 is disposed in the vicinity of the surface of the fine powder a, and allowing it to be in contact with the surface of the fine powder a or allowing it to shallowly invade as shown in FIG. 4. Accordingly, suction action of the carrier gas flowing through the feed nozzle 15 makes the fine powder a at the vicinity of the tip of the feed nozzle 15 simultaneously taken in to be entrained by and exhausted with the carrier gas. Note that, the invasion speed of the fine powder a into the outlet 15A of the tip of the feed nozzle 15 depends on the rotation speed of the fine powder storage container 11.

The feed nozzle 15 is inserted inside of the housing 12 from lid 18. The feed nozzle 15 is configured to be movable in the up and down direction in the housing 12 by the position control mechanism 17.

The position control mechanism 17 is provided on a lid 18 at an upper portion of the housing 12, and can move the feed nozzle 15 in the up and down direction. As for the position control mechanism 17, it is possible to use an electrical cylinder without particular limitation.

The position control mechanism 17 includes a cylinder body 30 that moves the feed nozzle 15 up and down, a rod 31 that is movable in the up and down direction in the cylinder body 30, a gripping portion 32 that is coupled to the rod 31 and grips the feed nozzle 15, and a drive mechanism 33. The position control mechanism 17 can adjust the height of the feed nozzle 15 held by the gripping portion 32 by adjusting the height of the rod 31. The feed nozzle 15 moves the gripping portion of the cylinder body 30 via the rod 31 in the up and down direction to adjust the position of the tip of the feed nozzle 15. This makes it possible to adjust the outlet 15A positioned at the tip of the feed nozzle 15 to an appropriate position at the vicinity of the fine powder a surface. For example, when the fine powder a in the fine powder storage container 11 is to be fed to the fine powder feed path L2, the position control mechanism 17 makes the tip of the feed nozzle 15 to fall towards the surface of the fine powder a. On the other hand, when stopping the feeding of the fine powder a in the fine powder storage container 11 to the fine powder feed path L2, the feed nozzle 15 is elevated so that the tip of the feed nozzle 15 does not come into contact with the fine powder a.

The motor 25 rotates the fine powder storage container 11 in a horizontal direction with respect to the axial direction. The fine powder storage container 11 is placed on a rotating seat 41 having a rotation axis 40 at the center of the bottom of the fine powder storage container 11, and by driving the motor 25, the rotation axis rotates, which makes the fine powder storage container 11 rotates. The motor 25 can rotate the rotation axis 40 at a speed corresponding to the feed amount of the mixed fluid c. By rotating the fine powder storage container 11, the fine powder a can be stably taken in by preventing the fine powder a from running out in the vicinity of the tip of the feed nozzle 15.

The position detection sensor 16 is fixed to the fine powder feed nozzle 15 while maintaining a predetermined height from the tip of the fine powder feed nozzle 15 and measures the distance to the surface of the fine powder a using the position of the tip of the fine powder feed nozzle 15 as the measuring standard. The position detection sensor 16 detects the surface position of the fine powder in front of the outlet 15A at the tip of the fine powder storage container 11 on the trajectory of the relative motion drawn with respect to the rotation of the fine powder storage container 11. Accordingly, it is possible to measure the height of the surface position of the fine powder a suctioned from the outlet 15A and the outlet 15A beforehand. The height of the feed nozzle 15 can be appropriately adjusted from the measurement result of the position detection sensor 16.

Figure 5:
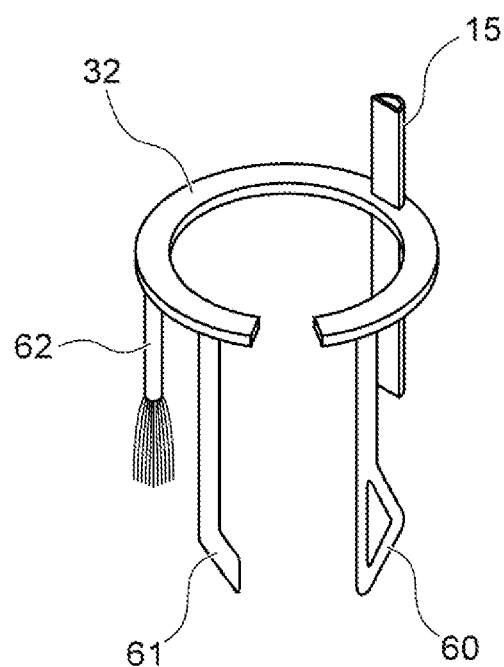

In addition, as shown in FIG. 5, a scraper 60, a flap 61, a brush 62, and the like may be fixed to and suspended from the gripping portion 32. By making the scraper 60, the flap 61, and the brush 62 fix to and suspend from the gripping portion 32, the surface of the fine powder a in the fine particle storage container 11 is evened, thereby making the surface smooth. This makes it possible to stabilize the amount of the fine powder a taken in from the feed nozzle 15 because the difference in the surface height of the fine powder a can be reduced. In addition, since the surface becomes smooth, the difference in the surface height of the fine powder a can be measured more accurately. It is not necessary to provide all of the scraper 60, the flap 61, and the brush 62 in the gripping portion 32, and one or more of these may be provided.

By using such a fine powder feeder 10, it is possible to suppress the static electricity which is generated during transfer of the mixed fluid c of the fine powder a and the carrier gas and to quantitatively and stably transfer and feed the fine powder to the fine powder using device.

<Gas Transfer Type Fine Powder Quantitative Feeding System>

Figure 6:
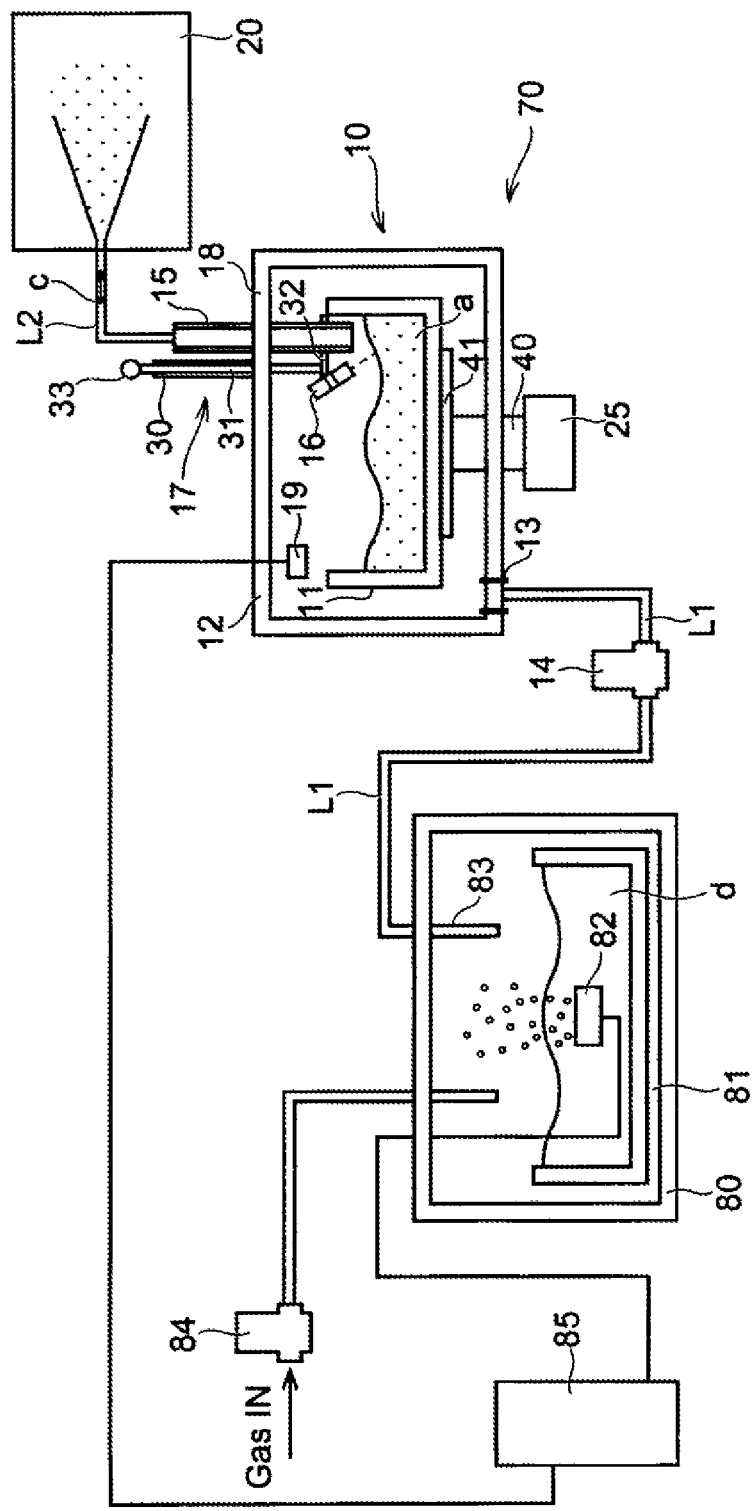

The gas transfer type fine powder quantitative feeding system according to the present invention shall be explained. FIG. 6 is a schematic figure of a gas transfer type fine powder quantitative feeding system 70 according to the present invention, which can be used for carrying out the fine powder quantitative feeding method as described above. The gas transfer type fine powder quantitative feeding system 70 according to the present invention includes a humidifying chamber 80 for humidifying a carrier gas, and a gas transfer type fine powder quantitative feeder 10 for quantitatively feeding a mixed fluid c of the carrier gas and a fine powder a to a fine powder using device such as a thermal spray device 20 by feeding the humidified carrier gas from the humidifying chamber 80. As described above, it is preferable to use a device that includes the fine powder storage container 11, the housing 12, the feed port 13, the first flow rate adjustment mechanism 14, the feed nozzle 15, the position detection sensor 16, the position adjustment mechanism 17, and the humidity measuring sensor 19, as the gas transfer type fine powder quantitative feeder 10; however, there is no limitation to such device and any gas transfer type fine powder quantitative feeder may be used as long as the effect of the present invention can be exerted.

The humidifying chamber 80 includes a water tank 81 for storing liquid d for humidifying the carrier gas, an ultrasonic vibration mechanism 82 for atomizing the liquid d, a humidified carrier gas feed nozzle 83 for feeding the humidified carrier gas to the device via the carrier gas feed path L1, and a humidity control mechanism 85 for controlling the humidity in the housing 12 in conjunction with the moisture measuring sensor 19 in the housing 12 of the fine powder feeder 10. The humidifying chamber 80 is, for example, formed in a cylindrical shape in a gas-tight manner. Water tank 81 is, for example, formed in a cylindrical shape, and the top is opened.

The water tank 81 is provided with liquid d for humidifying the carrier gas and an atomizing ultrasonic vibration mechanism 82 for atomizing the liquid d. The liquid d for humidifying the carrier gas is preferably water; however, liquid other than water may be used if desired. Also, water is atomized by the ultrasonic vibration mechanism 82 in the present embodiment; however, if the carrier gas can be humidified, water may be evaporated by heating.

The ultrasonic vibration mechanism 82 is formed of a voltage element and a high-frequency power source and is for conducting ultrasonic vibration by applying high-frequency electric field to piezoelectric elements, and is capable of atomizing the liquid d such as water by the vibration energy of the vibration mechanism 82. The atomized liquid d such as water can be humidified to a desired humidity range by being mixed with the dry carrier gas in the humidifying chamber 80.

The humidity measuring sensor 19 monitors the humidity of the casing space b in the housing 12 of the fine powder feeder 10. For the sake of maintaining the humidity in the casing space b within a predetermined range, the humidity measuring sensor 19 can adjust the humidity of the carrier gas to be fed to the fine powder feeder 10 with the humidity control mechanism 85 based on the humidity measurement result, by controlling the output of the atomizing ultrasonic vibration mechanism 82 and the amount of dried gas to be supplied to the humidifying chamber 80 with the second flow rate adjustment mechanism 84.

<Humidifying Unit>

Figure 7:
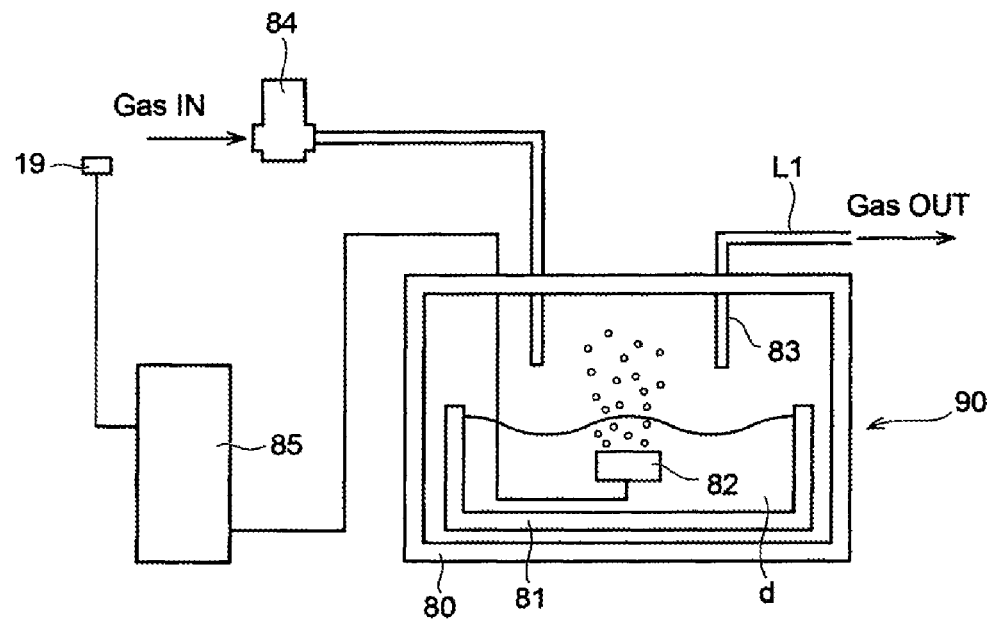

A humidifying unit according to the present invention will be explained. FIG. 7 is a schematic view of a humidifying unit 90 according to the present invention, which is used in the gas transfer type fine powder quantitative feeding method or gas transfer type fine powder quantitative feeding system 70 as described above. The humidifying unit 90 according to the present invention comprises a humidity measuring sensor 19 for measuring humidity of the casing space b in the housing 12 of the fine powder feeder 10, a humidifying chamber 80 for humidifying the carrier gas, and a humidified carrier gas feed nozzle 83 for feeding the humidified carrier gas to the device, wherein the humidifying chamber 80 comprises a water tank 81 that stores liquid d for humidifying the carrier gas, an ultrasonic vibration mechanism for atomizing the liquid d, a second flow rate adjustment mechanism 84 for controlling the amount of dried gas for supplying to the humidifying chamber 80, and a temperature control mechanism 85 for controlling humidity in the housing 12 in conjunction with the humidity measuring sensor 19.

The humidity control mechanism 85 adjusts the output of each constituting member which constitutes the humidifying chamber 80 in conjunction with the humidity of the casing space b in the housing 12 of the fine powder feeder 10 measured by the humidity measuring sensor 19, and adjusts the humidity and flow rate of the humidified carrier gas fed from the humidifying chamber 80 to the fine powder feeder 10, which makes it possible to maintain the humidity of the casing space b at a predetermined value.

<Control Portion>

The gas transfer type fine powder quantitative feeding system or the humidifying unit of the present invention may further include a control portion (not illustrated). The control portion may be connected to each constituting member such as the first flow rate adjustment mechanism 14, the position control device 17, the motor 25, the ultrasonic vibration mechanism 82, and the second flow rate adjustment mechanism 84, based on information obtained from the position detection sensor 16 and the humidity measuring sensor 19.

In one aspect of the present invention, the operation of the motor 25 is controlled by the control portion, and the rotation axis 40 can be rotated at a speed corresponding to a desired feed amount of the mixed fluid c.

In one embodiment of the present invention, the driving unit 33 is controlled by the control portion based on the measurement result of the position detection sensor 16, and the height of the feed nozzle 15 is appropriately adjusted to a predetermined height, whereby the amount of intake of the fine powder a can be controlled.

In one aspect of the present invention, the control portion may have a function of the humidity control mechanism 85, and can adjust the humidity of the humidified carrier gas fed to the gas transfer type fine powder quantitative feeder 10 by adjusting the output of the ultrasonic vibration mechanism 82 and the amount of dry gas fed to the humidifying chamber 80 by the second flow rate adjustment mechanism 84 based on the measurement result of the humidity measuring sensor 19.

The control portion can be configured by including, for example, a memory means that stores a control programme and various storage information, and an arithmetic means that operates based on the control programme. In order to calculate the feed amount of the humidified carrier gas to the fine powder quantitative feeder 10, the memory means previously obtains for example, the relationship between the humidity of the casing space b and the carrier gas feed speed, the relationship between the humidity of the casing space b and the output of the ultrasonic vibration mechanism 82, the relationship between the intake amount of the fine powder a in the fine powder storage container 11 to the feed nozzle 15 and the rotation speed of the motor 25, by testing, etc. and memorize the calculated relational expression or correlation table.

The control portion can appropriately adjust the amount of the dried gas fed to the humidifying chamber 80, the output of the ultrasonic vibration mechanism 82, the supply amount of the humidified carrier gas fed from the feed port 13 to the housing 12, the amount of the mixed fluid c fed from the fine powder quantitative feeder 10 to the thermal spray device 20, and the like based on the relational expression or the correlation table so that the fine powder can be quantitatively and stably transferred and fed during transfer.

Although the case where the fine powder is fed to the thermal spraying device has been described in the present embodiment, it is also possible to similarly apply to a fine powder using device such as a spacer spraying device of a liquid crystal substrate, powder compression molding, a sandblast device, or a powder coating device.

EXAMPLES

Hereinafter, the present invention will be described in more details with reference to the Examples; however, the present invention shall not be limited by the Examples.

Test Example 1 (Test on Relationship Between Electrostatic Scattering Time $\tau$ and Blockage in Tube)

[Test Method]

The relationship between electrostatic scattering time $\tau$ and blocking in the tube was tested by the following method.

(1) The electrostatic scattering time $\tau$ due to the difference in water content at each temperature of alumina powder having a particle size of 1 μm is determined.

(2) A certain amount of alumina powder having a particle size of 1 μm is charged into a fine powder storage container, and the gas transfer type fine powder feeder according to the present invention is operated to start feeding of the fine powder.

(3) The time point when the internal pressure in the fine powder feeder started to increase is set to 0 second, and fine powder feeding is performed for 600 seconds. Here, the reason why the internal pressure increase time is set to 0 second is because when the fine powder feed starts, the fine powder being transferred becomes resistance to the mixed fluid being transferred, and the internal pressure in the fine powder feeder increases due to the back pressure being applied to the fine powder feeder. That is, the increase of the internal pressure of the fine powder feeder becomes an index when the feeding of the fine powder substantially started.

(4) When the internal pressure of the tube used for the fine powder feed path exceeds the carrier gas feed pressure+10 kPa during the feed of the fine powder, the tube is determined as blocked, and when the internal pressure does not exceed the pressure value for 600 seconds, the tube is determined as unblocked.

(5) The tests of (1) to (4) are performed while changing the temperature and the relative humidity of the carrier gas. The absolute humidity is calculated from the measured values of the temperature and the relative humidity by the temperature and humidity sensor mounted in the fine powder feeder. The scattering time $\tau$ is calculated from the above-described method.

[Test Conditions]

Powder: $Al_2O_3$, #8000 1 μm
Carrier gas flow rate: $N_2$ 6.0 L/min.
Cup motor rotation speed: 300 rpm
FEED NOZZLE Controller offset value: −0.3 mm
Powder Surface Controller offset value: −168 mm
Example 1: No blocking (20° C., $\tau=10$).
Absolute humidity inside feeder: 12.2 g/m$^3$
Example 2: No blocking (25° C., $5<\tau<10$).
Absolute humidity inside feeder: 15 g/m$^3$
Comparative Example 1: Blocked (10° C., $\tau>20$)
Absolute humidity inside feeder: 2.1 g/m$^3$
Comparative Example 2: Blocked (15° C., $\tau>20$)
Absolute humidity inside feeder: 2.9 g/m$^3$
Comparative Example 3: Blocked (18° C., $\tau>20$)
Absolute humidity inside feeder: 6 g/m$^3$

[Test Results]

Figure 9:
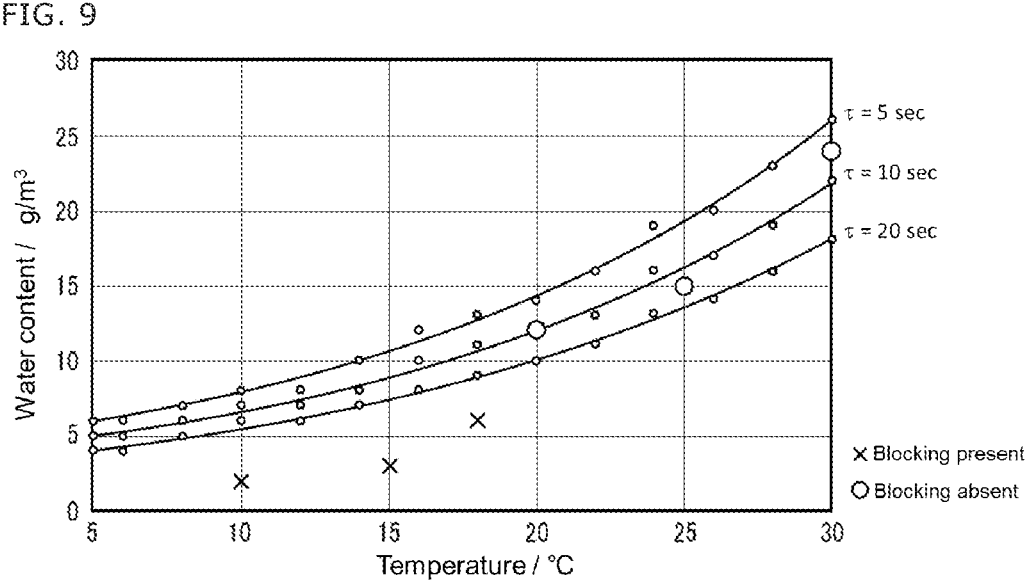

The relationship between the electrostatic scattering time $\tau$ and the blocking in the tube was tested, and the results are as shown in FIG. 9. Blocking was observed in the case where $\tau$ was 20 seconds or more; however, no blocking was observed in the case where $\tau$ was less than 20 seconds. Therefore, it was found that by setting the value of $\tau$ in a predetermined range at each temperature, the fine powder can be quantitatively and stably fed without blocking.

Test Example 2 (Fine Powder Feed Test)

[Test Method]

Test was carried out by the following method for the feedable time and blocking in the tube when the fine powder was fed continuously.

(1) A certain amount of alumina having a particle size of 1 μm is charged into a fine powder storage container, and a fine powder feeder is operated to start the feeding of the fine powder.

(2) The time point when the internal pressure of the fine powder feeder started to increase is set to 0 second, and the fine powder is fed for 600 seconds.

(3) When the internal pressure of the tube used in the fine powder transfer path exceeds the carrier gas feed pressure+ 10 kPa, it is determined that the tube is blocked, and the fine powder feed is stopped.

[Test Conditions]

Fine powder: $Al_2O_3$, #8000 1 μm
Carrier gas flow rate: $N_2$ 4. 5 L/min
Cup motor rotation speed: 550 rpm
Powder Surface Controller Offset Value: −0.5 mm
Absolute humidity inside feeder when carrier gas is not humidified: 15.1 $g/m^3$
Absolute humidity inside feeder when carrier gas is humidified: 5.5 $g/m^3$
Example 3: Humidified gas present
Comparative Example 4: Humidified gas absent

[Test Results]

Figure 10:
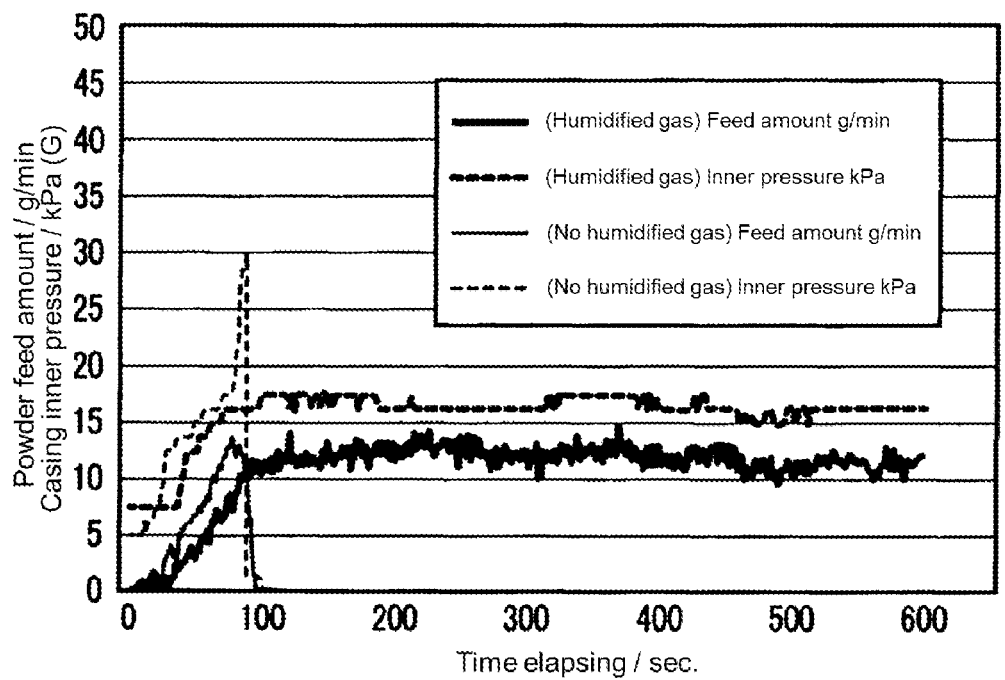

The feed amount of fine powder and the internal pressure at the time when the gas was not humidified and when the gas was humidified over time are as shown in FIG. 10.

The tube was observed with blocking after about 100 seconds from the start of feeding of the fine powder and the fine powder feeding was stopped in the system in which no gas humidification was performed (Comparative Example 4), whereas in the system in which gas humidification was performed, the tube was seen with no blocking even after 420 seconds from the start of the fine powder feeding, and the fine powder could be supplied quantitatively (Example 3).

Test Example 3 (Test on Relationship Between Absolute Humidity in Feeder and Alumina Fine Powder Feedable Time)

[Test Method]

(1) The electrostatic scattering time τ due to the difference in water content at each temperature of the alumina fine powder having a particle size of 1 μm is determined.

(2) A certain amount of alumina fine powder having a particle size of 1 μm is charged into a fine powder storage container, and the gas transfer type fine powder feeder according to the present invention is operated to start feeding of the fine powder.

(3) The time point when the internal pressure in the fine powder feeder started to increase was set to 0 second, and fine powder feeding was performed for 600 seconds. Here, the reason why the internal pressure escalation time is set to 0 second is because when the fine powder feeding starts, the transferred fine powder becomes a resistance of the mixed fluid to be transferred, and the internal pressure in the fine powder feeder rises due to the back pressure being applied to the fine powder feeder. That is, the increase of the internal pressure of the fine powder feeder becomes an index when the feeding of the fine powder substantially started.

(4) When the internal pressure of the tube used for the fine powder feed path exceeds the carrier gas feed pressure+10 kPa during the feed of the fine powder, the tube is determined as blocked and feeding is stopped, and the time until stopping is determined as the fine powder feedable time. When there was no blocking for 600 seconds, the fine powder feedable time is determined as 600 seconds.

(5) The tests of (1) to (4) are performed while changing the water content to be contained in the carrier gas. The absolute humidity is calculated from the measured values of the temperature and the relative humidity by the temperature and humidity sensor mounted in the fine powder feeder.

[Test Results]

Figure 11:
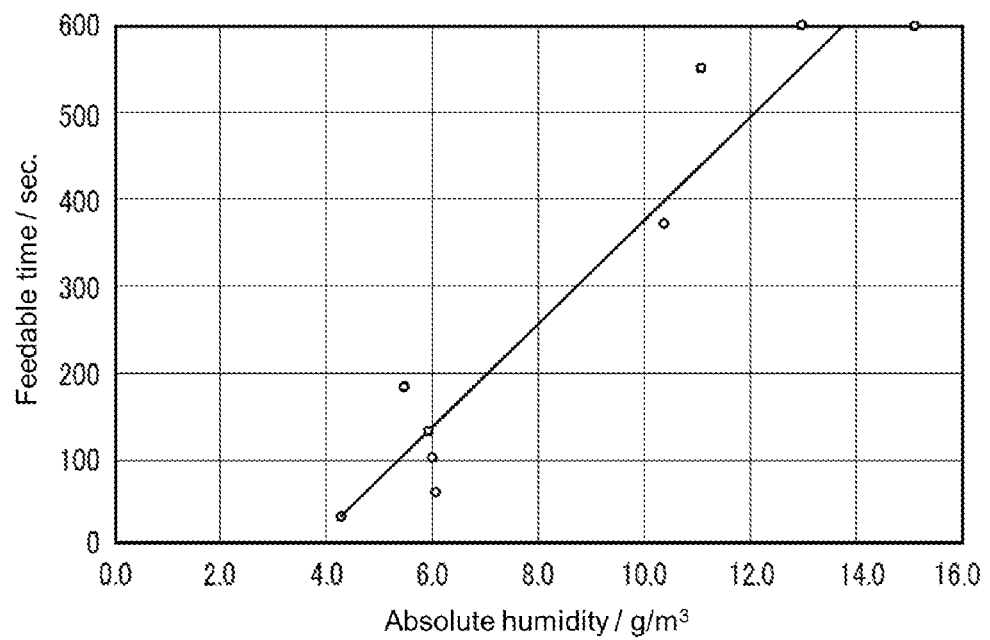

A proportional relationship was seen between the absolute humidity in the feeder and the alumina fine powder feedable time (FIG. 11). Based on this fact, it was found that the fine powder feedable time increases proportionally as the absolute humidity increases within a predetermined range.

DESCRIPTION OF REFERENCE

1 Transferring tube
10 Gas transfer type fine powder quantitative feeder
11 Fine powder storage container
12 Housing
13 Feed port
14 First flow rate adjustment mechanism
15 Feed nozzle
15A Outlet
16 Position detection sensor
17 Position control mechanism
18 Lid
19 Humidity measuring sensor
20 Thermal spraying device
30 Cylinder body
31 Rod
32 Gripping portion
33 Driving mechanism
40 Rotation axis
41 Rotary seat
60 Scraper
61 Flap
62 Brush
70 Gas transfer type fine powder quantitative feeding system
80 Humidifying chamber
81 Water tank
82 Ultrasonic vibration mechanism
83 Humidified carrier gas feed nozzle
84 Second flow rate adjustment mechanism
85 Humidity control mechanism
90 Humidifying unit
L1 Carrier gas feed path
L2 Fine powder feed path
a Fine powder
a' Deposited fine powder
b Casing space
c Mixed fluid
d Liquid

The invention claimed is:

1. A gas transfer fine powder quantitative feeding method, the method comprising:
quantitatively transferring and feeding a fine powder filled in a gas transfer fine powder quantitative feeder to a fine powder using device by a carrier gas,
wherein:
the fine powder using device is selected from the group consisting of a thermal spraying device, a spacer spraying device of a liquid crystal substrate, a powder compression molding, a sandblast device;
the gas transfer fine powder quantitative feeder comprises:

a fine powder storage container that stores the fine powder;

a housing that stores the fine powder storage container in a gas-tight manner;

a feed port that feeds the carrier gas to the housing;

a flow rate adjustment mechanism that adjusts a feed amount of the carrier gas to the housing;

a feed nozzle that feeds the fine powder from the fine powder storage container to the fine powder using device entrained with the carrier gas;

a position detection sensor for detecting a relative position between the feed nozzle and the fine powder surface;

a driving part that moves the feed nozzle in an up and down direction; and a humidity measuring sensor for measuring humidity in the housing; and when a mixed fluid of the fine powder and the carrier gas is transferred from the gas transfer fine powder quantitative feeder to the fine powder using device, a water content in the carrier gas is adjusted by humidity information acquired from the humidity measuring sensor to suppress an amount of static electricity that is generated in the mixed fluid.

2. The method according to claim 1, wherein the water content of the carrier gas is adjusted so that scattering time $\tau$ of static electricity generated in the mixed fluid is 0 to 10 seconds.

3. The method according to claim 1, wherein the fine powder has an average particle size of 10 μm or less.

4. A gas transfer fine powder quantitative feeding system comprising:

a humidifying chamber for humidifying a carrier gas; and a gas transfer fine powder quantitative feeder that quantitatively feeds a mixed fluid of the carrier gas and fine powder to a fine powder using device by feed of the carrier gas from the humidifying chamber, wherein the gas transfer fine powder quantitative feeder comprises:

a fine powder storage container that stores the fine powder;

a housing that stores the fine powder storage container in a gas-tight manner;

a feed port that feeds the carrier gas to the housing;

a flow rate adjustment mechanism that adjusts a feed amount of the carrier gas to the housing;

a feed nozzle that feeds the fine powder from the fine powder storage container to the fine powder using device entrained with the carrier gas;

a position detection sensor for detecting a relative position between the feed nozzle and the fine powder surface;

a driving part that moves the feed nozzle in an up and down direction; and a humidity measuring sensor for measuring humidity in the housing; and wherein the humidifying chamber comprises:

a water tank that stores liquid for humidifying the carrier gas;

an ultrasonic vibration mechanism for atomizing the liquid; and a humidity control mechanism for controlling humidity in the housing in conjunction with the humidity measuring sensor.

5. The gas transfer fine powder quantitative feeding system according to claim 4, wherein the humidity control mechanism adjusts the water content of the carrier gas so as to reduce generation of static electricity in the mixed fluid.

6. The gas transfer fine powder quantitative feeding system according to claim 4, wherein the average particle size of the fine powder is 10 μm or less.

7. A carrier gas humidifying unit for use in the gas transfer fine powder quantitative feeding system according to claim 4, comprising:

a humidity measuring sensor for measuring humidity in the housing;

a humidifying chamber for humidifying the carrier gas;

a humidifying carrier gas feed nozzle for feeding the humidified carrier gas to the device;

wherein the humidifying chamber comprises:

a water tank that stores liquid for humidifying the carrier gas;

an ultrasonic vibration mechanism for atomizing the liquid; and a humidity control mechanism for controlling humidity in the housing in conjunction with the humidity measuring sensor.

8. The method according to claim 2, wherein the fine powder has an average particle size of 10 μm or less.

9. The gas transfer fine powder quantitative feeding system according to claim 5, wherein the average particle size of the fine powder is 10 μm or less.

* * * * *